(12) United States Patent
Fingerman et al.

(10) Patent No.: US 7,143,430 B1
(45) Date of Patent: Nov. 28, 2006

(54) METHOD AND APPARATUS FOR REMOTE AUDIOVISUAL SIGNAL RECORDING SERVICE

(75) Inventors: Adam W. Fingerman, Princeton, NJ (US); Sitarama S. Kocherlakota, Naperville, IL (US); Franklin B. Rimalovski, Maplewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/440,434

(22) Filed: Nov. 15, 1999

(51) Int. Cl.
*H04N 7/173* (2006.01)
*H04N 5/91* (2006.01)

(52) U.S. Cl. .......................... 725/87; 725/88; 725/104; 386/46; 386/83

(58) Field of Classification Search ................ 709/201, 709/202–203, 102, 211, 212, 215–219, 227–229, 709/231–232, 238; 386/83, 46; 725/1, 5, 725/39, 55, 87, 88, 47, 56, 104
See application file for complete search history.

(56) References Cited

U.S. PATENT DOCUMENTS

| | | | | | |
|---|---|---|---|---|---|
| 5,734,823 | A | * | 3/1998 | Saigh et al. ................. | 709/229 |
| 5,991,809 | A | * | 11/1999 | Kriegsman ................... | 709/226 |
| 6,324,338 | B1 | * | 11/2001 | Wood et al. ................... | 386/83 |
| 6,351,776 | B1 | * | 2/2002 | O'Brien et al. ............. | 709/245 |
| 6,611,654 | B1 | * | 8/2003 | Shteyn ......................... | 386/83 |

* cited by examiner

*Primary Examiner*—Krisna Lim

(57) ABSTRACT

A method and apparatus for receiving requests for the remote storage of time schedule media programs from a client over the Internet and the delivery of such media programs in a specified streaming video format to the client is disclosed. The client requests the recording of a media program by a delivery device which delivery device identifies, in an e-mail message to the client, the storage location of the requested program in the delivery system. The client then accesses the delivery system via the Internet using the storage location identity and the delivery system delivers the stored program. The method and apparatus receives media program signals from distributed geographic locations to provide the client access to media programs not available at the client's location. Tools are also provided to simplify media program selection and storage.

15 Claims, 13 Drawing Sheets

☒ Your program is going to be erased! - TVStorage

To: John Client

Your program is going to be erased! The television program that you recorded is going to be erased in 24 hours.
You will not be able to watch it after Wednesday, August 25, 1999, 8:00 PM EST.

The Simpsons
Wednesday, August 18, 1999
7:00 - 7:30 PM
WYNY - Channel 5

To watch it, click here: http://www.TVStorage.net/account=Client@TVStorage.com:program=BZD1TRY3 ← 611
To purchase a 1 week extension for $1.95, click here: http://www.TVStorage.net/account=client@TVStorage.com ← 613
Thank you for using TVStorage.net.

Please visit our TVStorage.net sponsor of the day.

FIG. 8

YOU HAVE REQUESTED PROGRAM
STORAGE REQUIRING 1 HOUR OF STORAGE
AND YOU ONLY HAVE 30 MINUTES
OF STORAGE AVAILABLE.

CLICK HERE TO BUY MORE
↗
601

FIG. 12

METHOD AND APPARATUS FOR REMOTE AUDIOVISUAL SIGNAL RECORDING SERVICE

CROSS-REFERENCE TO RELATED APPLICATIONS

U.S. patent application Ser. No. 10/839,319 entitled, "Method and Apparatus for Remote Audiovisual Signal Recording" filed on May 5, 2004, which is a continuation of U.S. application Ser. No. 09/440,356 filed on Nov. 15, 1999, now abandoned, which is assigned to the assignee of the present application, discloses a related method and apparatus and the contents of that application are hereby incorporated herein by reference.

BACKGROUND OF THE INVENTION

This invention relates to the delivery of multi-media signals such as television to clients via computer networks such as the Internet. More particularly, the invention relates to methods and apparatus for selectively receiving time scheduled signals from a plurality of sources and at the request of a client, for the client.

In the course of the following description, television signals are mentioned as a most common example but the media program signals could be any media signals such as broadcast AM or FM, television or any other signals desired by a client. Also, the term "time scheduled signals" is employed to mean any type of signal the presentation time of which is known but the time of presentation is not generally controlled by the provider of services herein. Such time scheduled signals may include, broadcast television, broadcast FM, cable television and FM, satellite television and FM signals and closed circuit presentations.

The modern television and FM user has a wide array of possible signal sources available from which to choose. Such sources include standard broadcast television, cable network and satellite systems of many varieties. Each of these systems and others not named require a different type of receiver/decoder and most users have only one or two types of service which they can actually receive. Economically, the user cannot afford to have access to all or even most of the sources of media programming. Further, even when a person can afford to own all of the equipment, much of it will be seldom used and thus not an economic value.

Cable television systems are an attempt to provide full media coverage to households by sharing the costs of receiving many types of signals and delivering those signals to users in a standard format. Although the costs of a cable system can be shared by many users, the bandwidth available for cable revenue is limited so the cable service providers decide on a general basis which media channels will be available to their subscribers. Thus the range of available programs is limited. What is needed in the art is a media delivery system which has shared usage so that many types of signal source formats can be afforded while permitting individual users to specifically request which media programs they want to receive at any given time.

Such a shared media program reception method and apparatus satisfies other needs in the art. Video tape recorders (VTR), which are often video cassette recorders (VCR), are common today and are present in many if not most households. The VTR itself includes many complex mechanical and electrical functions and is subject to many types of well-known failures. Without a back-up VTR at the user's home, a failure may prevent recording a desired program. With a VTR, a viewer can record from broadcast media and play the recording back at a later time. Although most modern VTRs enable some rather sophisticated procedures for recording selected future programs, it appears from the popular press that most households are not capable of using those procedures. The most common use of the VTR is to manually turn on the recording function at the time the program is to be recorded is airing or to play pre-recorded tapes. Systems such as VCR+ have been developed which simplify the operation needed for recording future programs but these normally add cost to the recording system and are still too complicated for use in many households. The result is that consumers have not achieved the television viewing freedom they might if recording were less expensive and easier to perform.

Recently, products such as TiVo of Sunnyvale, Calif. (www.TiVo.com) and Replay TV of Mountain View, Calif. (www.ReplayTV.Com) have come into the market, providing a new way of recording broadcast programming at the viewer's location. These products, which are called home hard drive systems herein, use a "set-top box" at the viewer's premises to receive video programs available to the consumer and to store related ones of the available programs. Storage occurs on a high capacity hard disk drive located inside the set-top box. Such a home hard drive system may cost from $500 to $1,500 at this writing and like VTRs, they are subject to mechanical and electrical failures which can leave the consumer without a means of recording a desired program. Further, the video programs in many homes are delivered through cable TV receivers/decoders and/or direct satellite TV receivers/decoders. In order to properly store video programs from such receiver/decoders, the home hard drive systems must control the operation of the separate receivers/decoders. Otherwise, the receivers/decoders would not be turned on to the proper signal source when needed. Such control is usually exercised by the transmission of infrared control signals from the home hard drive system, however, training from the home hard drive system to perform such tasks may be difficult and may also be subject to failures.

Another problem of the home hard drive systems, is that like VTRs, storage is at the viewer's premises and is limited to storage of programs which are already available at the consumer's premises. Lastly, the home hard drive systems contain a fixed amount of storage, and, should more storage be needed, such can be added only by expensive and complex replacement and/or augmentation of their high capacity disk drive.

What is needed in the art is an improved broadcast media recording system which avoids per viewing device storage equipment and which provides a simplified human/machine interface to access media programs available in different geographic locations from the viewer's location.

SUMMARY OF THE INVENTION

A system and method in accordance with the present invention provides a broadcast media recording and/or delivery without per viewer location recording media and in so doing avoids the costs and complexity of prior systems. The control of the recording event and the delivery of the media is performed over a computer network such as the well known Internet.

The aforementioned problems are solved and an advance is achieved in accordance with the invention which is a method and apparatus for receiving time scheduled media programs and in response to a request from a client which is remote from the program reception, selecting a specified media program and delivering the selected program to the client via a digital network such as the Internet. An embodiment of the invention includes plurality of a delivery systems each connected to a plurality of media program sources and to one or more clients via the Internet. The media program sources may include cable television systems, satellite transmission systems, CCTV or other sources of media programming. With this wide array of media sources the client has access to ordinary television programming such as soap operas, movies and broadcast sporting events, and to more esoteric media programming such as corporate board meetings or instructional medical procedure programs via CCTV. The plurality delivery systems may advantageously be at geographically separated locations and have access to different media program sources than are available at a client's premises. In accordance with an embodiment a client may select or be otherwise assigned a preferred geographic location from which to select media programs, however, the client also has access to media program signals available at other locations.

In an embodiment, the client contacts a client server of the media reception and delivery system via the Internet and specifies which media program he or she would like to receive as well as a streaming video format and data rate at which the program should be sent to the client. The client server validates the client request and advises a scheduler portion of the delivery system of the desired program and the delivery format and data rate. The schedule allocates a receiver to receive the specified media program and an encoder to convert the received program into requested video format. The scheduler begins the receiving and encoding at a time just prior to the scheduled "airing" of the requested media program.

The reception and delivery system of an embodiment may be distributed to a wide variety of geographic locations so that a client may contact a client server in one location to control the storage of multimedia signals in another location. For example, a client in Chicago can submit a request for storage of a broadcast television cricket match in India. A reception and delivery system in India can respond to the request by storing the requested cricket match and distributing it to the client. Thus the client has an opportunity to record, view, and/or play back programs not normally accessible to the client.

The client server of an advantageous embodiment stores media program schedules for each of the distributed reception and delivery systems around the world. A client may be assigned a preferred program schedule or listing which shows the media programs available at one of the distributed reception and delivery systems. The client, however, has access to the schedules of the other reception and delivery systems. In one embodiment the client is presented with its preferred listing and is given the opportunity to select and view the listings of other locations from which storage choices may be made. A search tool is also available at the client server into which the client can enter media program keywords. The search tool searches the listings of the preferred and other available listings to create a present to the client a list of media programs matching the key words. The created and presented list may well include media programs available at a plurality of geographical locations from which the client can choose media programs for storage.

The encoded media program is stored by the delivery in digital format in a high speed-high capacity store. When the scheduled time for completion of the requested media program occurs, the reception and encoding stops and the delivery system prepares and sends an electronic mail (e-mail) message to the client identifying one of a plurality of program delivery devices and the address of the file storing the digitized media program. Advantageously, the e-mail to the client includes a URL which identifies both the delivery device and the file address. When the client wishes to receive the stored program he or she transmits on the Internet the URL obtained from the delivery system e-mail. The delivery device of the delivery system responds to the URL by reading the media program from storage and transmitting it to the client over the Internet in the format requested by the client.

The client server maintains a file for each client which identifies, among other things, a value representing an amount of storage allocated to the client. When storage is used the client server subtracts the amount used from the allocated amount and, should the client request more storage than allocated, the system may refuse the storage request and/or offer the client additional storage amounts. From time to time the client server may advise the client that a previously requested stored media program is about to expire. Such advice may also include an option to extend the expiration date of the subject stored media program.

BRIEF DESCRIPTION OF THE DRAWINGS

A more complete understanding of the invention may be obtained from consideration of the following description in conjunction with the drawing, in which:

FIG. 8 represents a video screen warning a client of imminent program erasure;

FIG. 12 represents a screen delivered to a client requesting more storage than allocated to that client.

DETAILED DESCRIPTION

Figure 1:
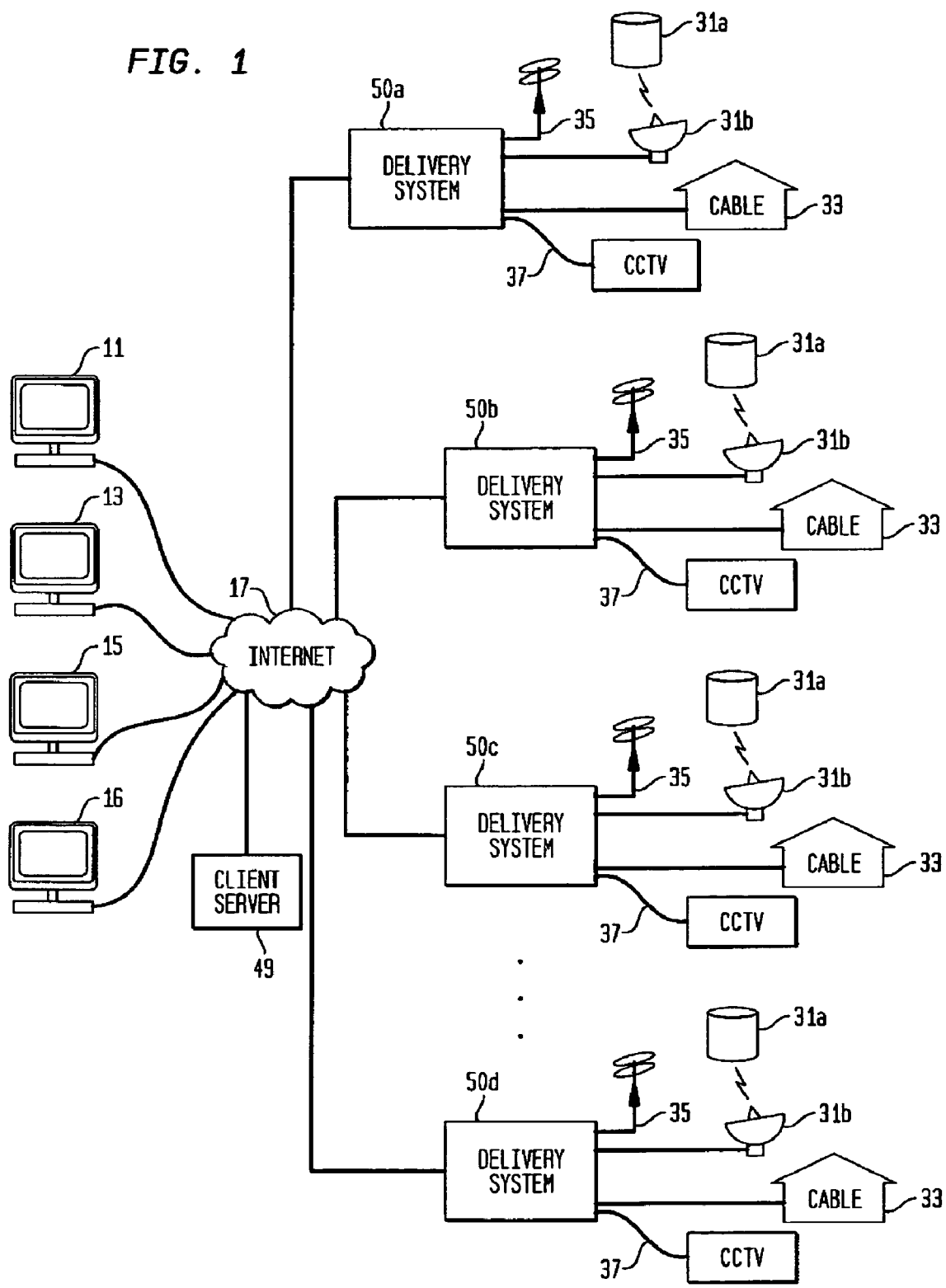
FIG. 1 is a block diagram of Internet connected and geographically distributed apparatus for media program storage and delivery to clients.

FIG. 1 shows a system for accepting requests for recording and/or presentation of media programming from a plurality of clients 11, 13, 15 and 16 and for delivering media programming to those clients. The emphasis in this description is on the delivery of video program such as television, however, it must be kept in mind that the media programs delivered may be audio or video and that the video programs may include an audio portion. In FIG. 1, client 11 is connected to the Internet 17 via an analog modem and has a maximum data throughput of 56 K bps. Client 13 is connected to the internet via an XDSL connection and has a data throughput of approximately 6 M bps and client 15 is connected via a LAN and has a data throughput of 10 to 100 M bps. Lastly, client 16 is connected to the Internet via a cable modem. Although the Internet is used as a communication device in the present embodiment, the present method and apparatus could operate with any type of digital network.

The clients 11, 13, 15 and 16, which represent a large number of possible clients, are connectable via the Internet 17 to a client server 49 and a plurality of media delivery systems 50a–50d. Each of the delivery systems may be located in a different geographic area than the others and receive media programs such as satellite signals 31a and 31b, cable TV service 33, broadcast TV 35 and CCTV 37. The delivery systems may be located, for example, in all major metropolitan markets around the world. That is, delivery systems provide media program access in, for example, New York, Chicago, Denver, Los Angeles and Honolulu in the U.S., as well as many major metropolitan markets around the world. Thus, the client has access to different time zones and media programs in the U.S. and many also access media programs from Helsinki, Paris, Rome, Tokyo, Rio de Janeiro and many other equipped cities. The client server 49 is accessed by the URL of overall system of FIG. 1 and implements initial client-system interaction with the remainder of the FIG. 1 system. In the present embodiment the clients contact client server 49 to establish membership and to place their requests for media program recording. The client server validates new membership and client accesses and also forwards requests for media program storage to selected delivery systems capable of recording requested programs.

Figure 2:
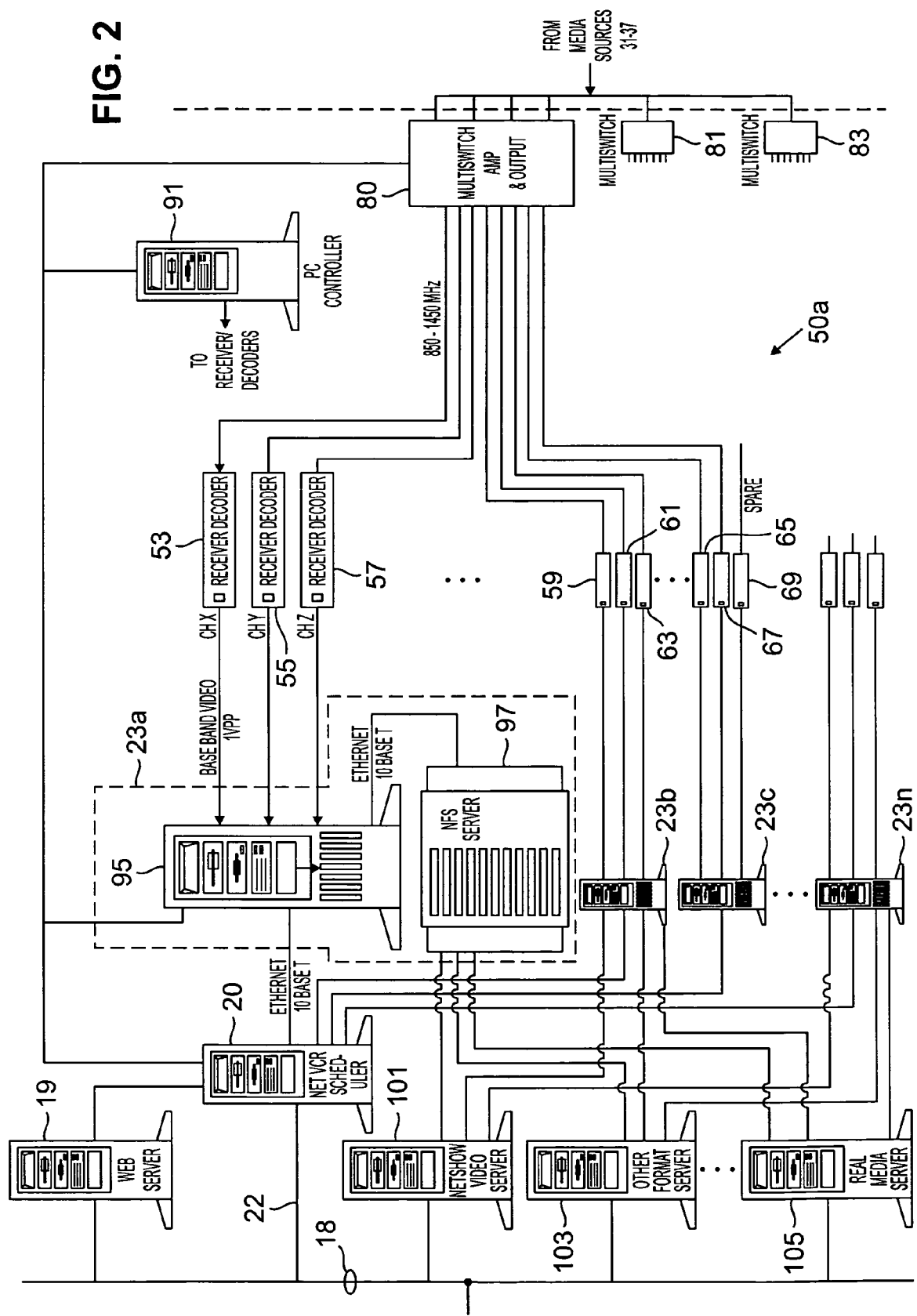
FIG. 2 is a block diagram of a delivery system shown in FIG. 1.

Client server 49 maintains a schedule or listing of the media programs available at each of the delivery systems 50a–50d. The client server, upon receiving a request for storage of a specific media program from a client, identifies from its schedule of media programs one of the delivery systems 50a–50d which has access to the specified program. The client server 49 then forwards data such as data rate, video format and e-mail address of the client to a scheduler 20 the identified delivery system, e.g. 50a. FIG. 2 is a block diagram of delivery system 50a which also represents delivery systems 50b, 50c, and 50d, which are substantially similar. A scheduler 20 of delivery system 50a receives the message from the client server 49.

Scheduler 20 responds to the message by overseeing the operations of the delivery system 50a to receive a specified media program and make it available to the clients. Scheduler 20 maintains current and future information regarding the schedule of media programs available on the various media sources, e.g. 31a–37 and their times of availability. The primary sources of such scheduling information can be accessed via the Internet 17 which is available on connection 22.

When a media program requested by a client is playing or is about to play, scheduler 20 connects the signal source conveying the program to a receiver/decoder such as receiver/decoder 53 which is appropriate for the signal source to produce a standard base band signal of the selected media program. As is shown in FIG. 2, a plurality of receiver/decoders 53–69 is present in the embodiment. For example, if a channel X from satellite 31a is to be made available to a client, e.g. 15, schedule 20 transmits a connection request to a multiswitch such as multiswitch 80, to connect the source signals from satellite 31a to a specified receiver/decoder, e.g. 55, for signals from that satellite. Multiswitch 80 responds to the request by connecting the signals to the specified receiver/decoder, e.g. 55. At the same time, scheduler 20 sends a receiver/decoder command to a receiver controller 91 specifying that channel X is to be converted by receiver 55 into base band. In the present embodiment, each receiver/decoder, e.g. 55, can produce a base band output signal for one video channel at a time. Accordingly, a delivery system for simultaneous delivery and/or recording of 200 video channels would include at least 200 receivers/decoders. The receiver/controller 91 is connected to all of the receivers/decoders 53–69, and transmits to them the necessary parameters to receive and/or decode the signals from the specified source, e.g. 31a, into video base band. The operation of such digitally controlled receivers/decoders is well known and not described in detail.

The video base band output signals of each receiver/decoder, 53–69, are connected to a predetermined one of a plurality of video digitizers 23a through 23n. The video digitizers of the present embodiment are 450 MHZ Pentium II NT work stations and which are each connected to three base band video signal inputs from the receiver/decoders. In other embodiments, the digitizers may be less capable and perhaps be connected to only a single receiver/decoder. Similarly, more capable video digitizers may be connected to more than three receiver/decoders.

Each video digitizer comprises a high capacity processor 95 and a high capacity storage device 97, such as the Sun Solaris box storage array 5000. The processor, e.g. 95, receives each of the incoming base band video signals from its connected receiver/decoders, e.g. 53, 55 and 57, and converts each received signals into an uncompressed AVI format. The uncompressed AVI is then converted into a format specified by a client in the original request from the client. The converted video/audio signal is then stored in a file on storage device 97 for replay to the requesting client. It should be mentioned that actions by the processor 95 occur in response to directions from the scheduler 20.

Delivery system 50 also includes a plurality of playback servers of which playback servers 101, 103 and 105 are shown in FIG. 2. Each playback server has one or more Internet addresses and is connected to a retrieve stored files from the high capacity stores, e.g. 97, of all of the video digitizers, e.g. 23. The software control of the playback server responds to requests from clients for a particular URL including a file identity by retrieving the video represented by the URL from a predetermined high capacity store and transmitting streaming video derived from the video file to a requesting client. The high capacity store storing each recorded video program is identified to the playback servers 100, 103 and 105 by the scheduler 20 as is the address of the particular file.

Advantageously, the playback to a client occurs in one of the streaming video format which the client can receive. When a client first request a media program from request server 49, the desired streaming video format is specified with the request. The scheduler 20, in response to the request information, identifies the requested playback format to the video digitizer selected to record the video program. The video digitizer then converts the uncompressed AVI of the video program into the requested format before storage in a high capacity store.

In the present embodiment, a client must become a service member prior to making requests for media delivery. Such membership allows the delivery system to record certain default parameters for media selection and delivery and allows the delivery system to establish a method of payment for services, if such is desired. In other embodiments such memberships may not be required and the client may merely contact the client server 49 and request media delivery and/or storage.

Figure 3:
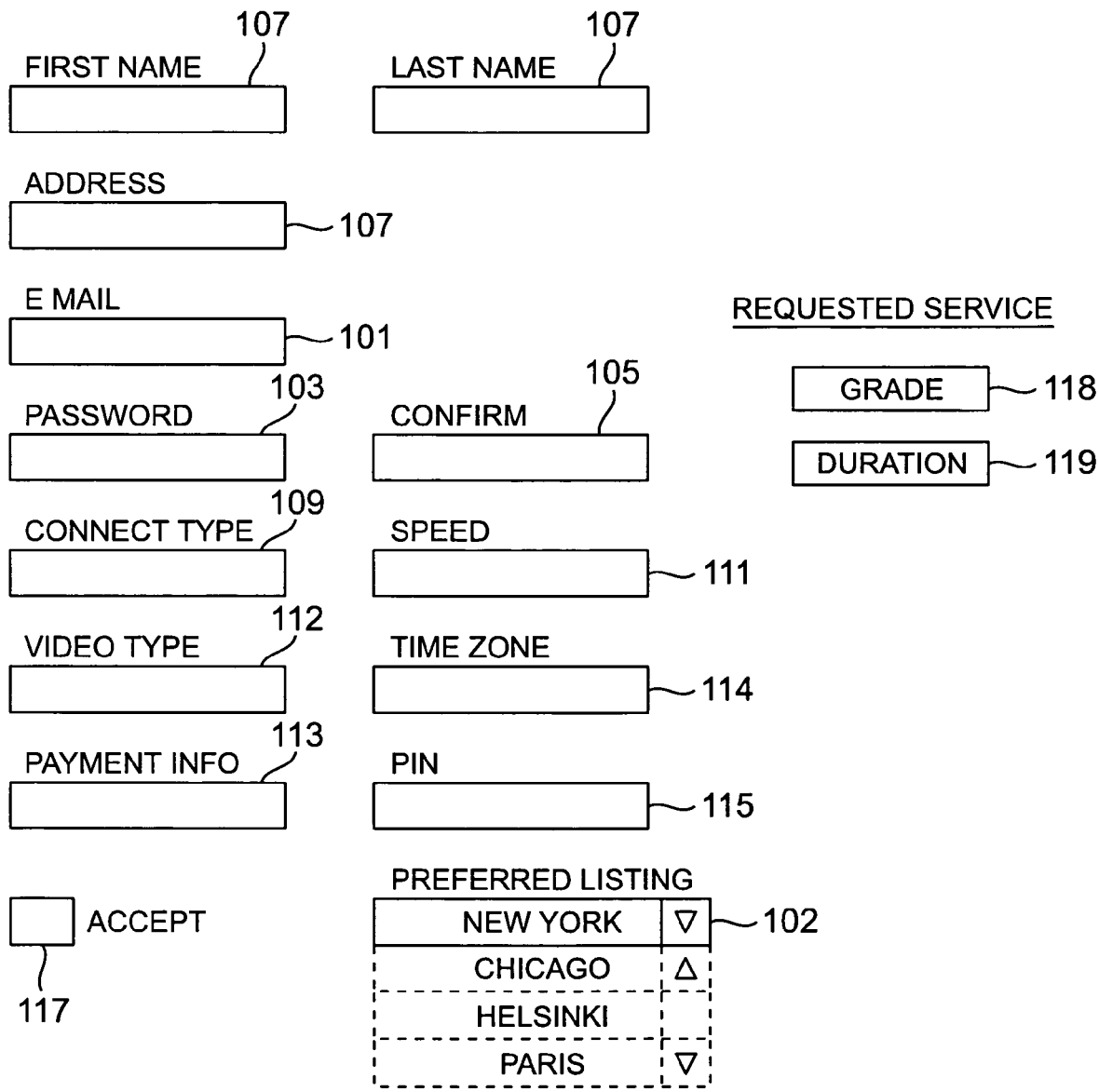
FIG. 3 represent a video screen presented to a client during membership sign-up.
Figure 10:
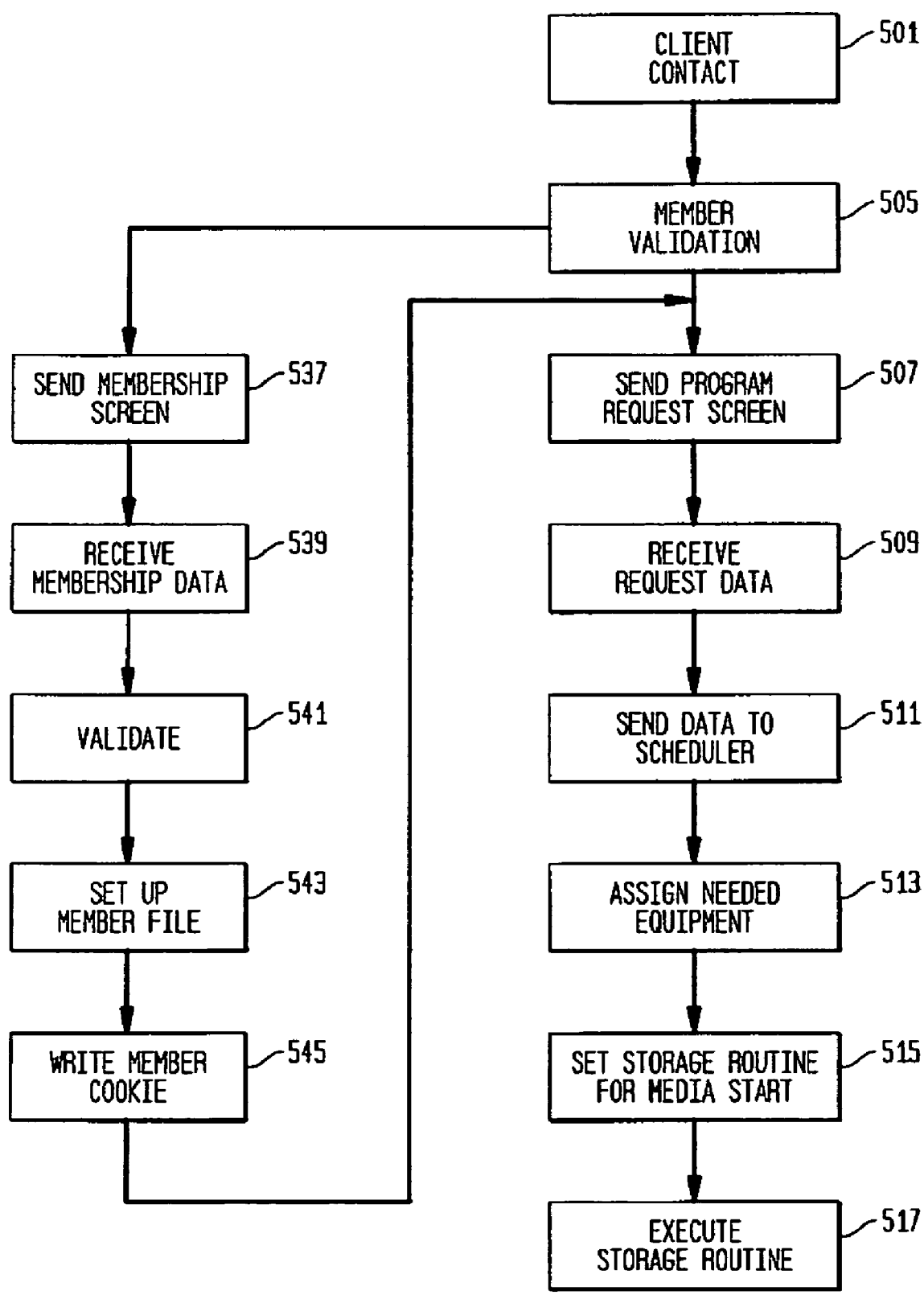
FIG. 10 is a flow diagram of the operation of a client server and media delivery system of FIG. 1.

A client, e.g. 15, may contact the client server 49 at any time using a widely distributed URL to the service provider's home page. When a client contacts the client server 49 (step 501 FIG. 10) prior to becoming a member, a step 505 is performed to identify if the client is a non-member and a screen is presented (step 537) to the client asking whether the non-member client would like to become a member. If so, the client is presented with a screen of information boxes as shown in FIG. 3, a portion of which may constitute terms and conditions of membership (not shown). The client, after viewing the terms and conditions, enters his or her name and address into the boxes 107 and his or her e-mail address into a text box 104. In the present embodiment a client's electronic mail (e-mail) address is used as a log-in name for services, however, other embodiments may include a separate new text box for a separate log-in name. The client then enters in a text box 106 a password for later permission to use the service and confirms the password by retyping it in a confirmation box 108. The client also enters his or her connect type such as XDSL in a text box 109 and connect speed, e.g. 6 M bps in box 111. The client further specifies in a text box 112 the video format he or she would like to use to receive later requested signals. The client also enters payment information such as a credit card number in text box 113 and a PIN for use with the credit card in box 115. The client also selects by means of a drop down menu 102 a listing for a preferred geographical location which represents the delivery system to which the client will most frequently refer. In FIG. 3 the client has selected the geographical location "New York" in menu 102 to identify the listing of programs available at a New York delivery system. As a part of membership, the client also requests a particular grade of service and base storage duration by entering text in boxes 118 and 119. Table I is an illustrative example of a grade of service/storage duration pricing schedule which is intended merely to be illustrative.

TABLE I

| Hours | Medium Grade | High Grade |
| --- | --- | --- |
| 2 hours | Free | $14.95 |
| 4 hours | $9.95 | 24.95 |
| 6 hours | 14.95 | 29.95 |
| 1 hour per use | $1.95 | $3.95 |
| 1 week extension | $1.95 per program | |

In the schedule of Table I, medium grade represents the storage required to deliver media programs at 100 kbps and high grade represents the storage required to delivery media programs at 190 kbps. The storage duration and grade of service information is stored in a client identifiable file and used by the client server 49 in a manner discussed below to allocate resources to the client. After the boxes of the screen represented by FIG. 3 are filled in, the client clicks an accept button 117 and the information is sent to the client server 49 as membership data. Client server 49 validates the data in a step 541 and stores necessary parameters in a client membership file in a step 543. After information validation, the client server 49 returns a "thank you new member" screen to the client. The client server also sets a cookie (step 545) on the client computer to show that membership permission has been granted to the client.

Figure 4:
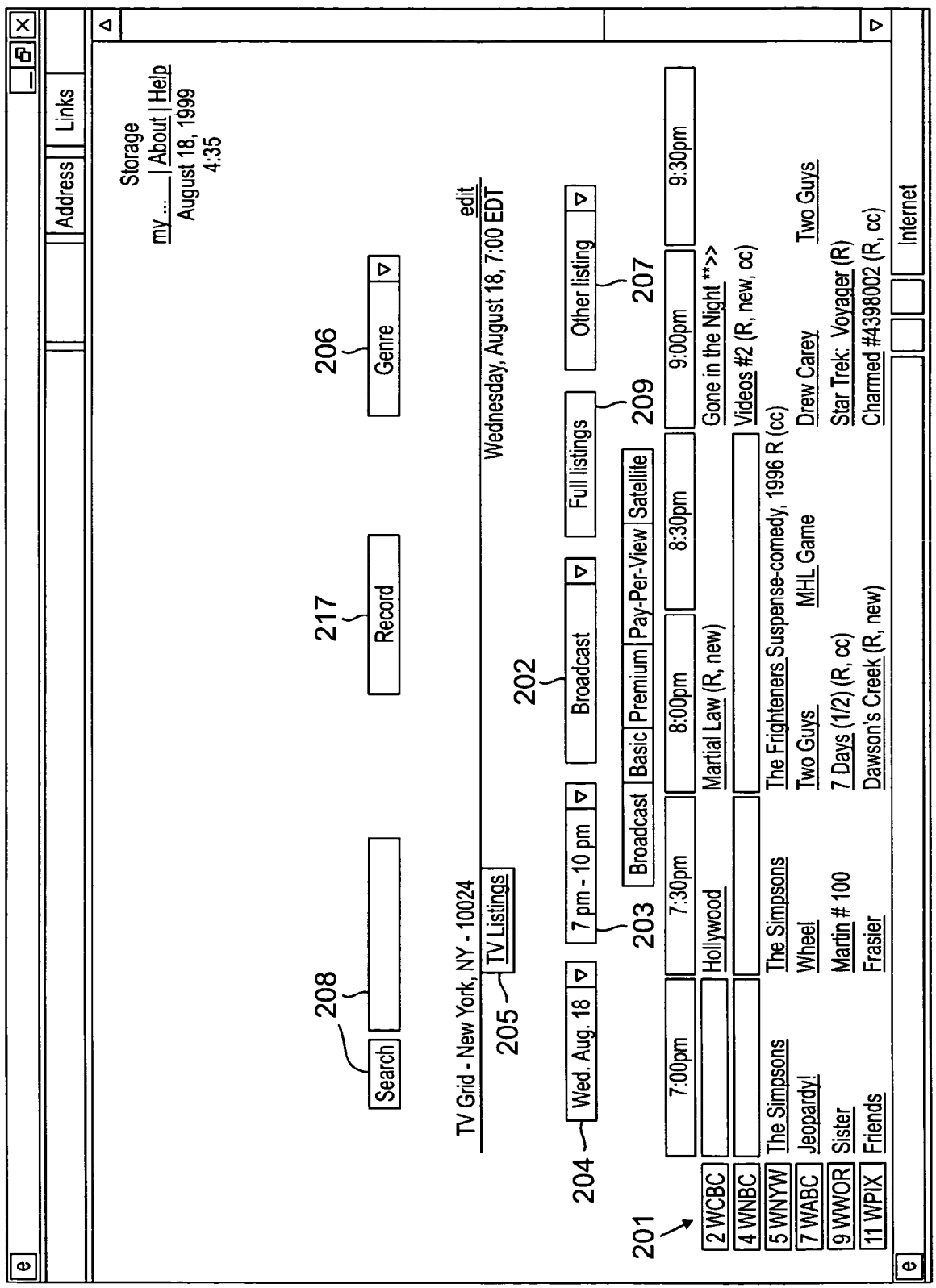
FIG. 4 represents a video screen presented to a client for requesting delivery of a specific media program.

A client who is a member is free to enter the URL of the client server 49 and be connected by the Internet to the client server 49 which will recognize the member status. Upon recognizing that the client is a member by entry of the client's password, and checking the client's cookie, the client server returns a program request screen (step 507 FIG. 10) to the client. Such a request screen, as is shown in FIG. 4, is used by the client to request a specific media program or programs for delivery to the client. FIG. 4 includes a schedule listing portion 201 which identifies programs available to the client for storage. Initially, the schedule presented is for the preferred location, e.g., New York, which was selected during membership. The screen shown in FIG. 4 is for the network broadcast television programs available from 7:00 to 10:00 P.M. Aug. 18, which is identified by pull-down menu boxes 202, 203, and 204 respectively. Should the client want a different source, time, or date, the pull-down menu box data can be changed in the known manner and a TV listings button 205 clicked. Clicking the button 205 sends the new source, time and date information from the boxes 202, 203 and 204 to the client server 49, which responds with an updated screen to show the new source, date and time listing. The source menu allows the client to view broadcast TV, regular cable, premium cable, pay-per-view, satellite listings or a combined listing of all categories. Should the client not want to record a program from the New York listing, a pull-down menu 207 may be updated with a new location, such as Chicago or Paris, and the TV listings button clicked. The new location listing data from menu 207 will be sent to the client server 49 which will respond by sending a new listing screen showing the media program listings for the selected location.

Figure 5:
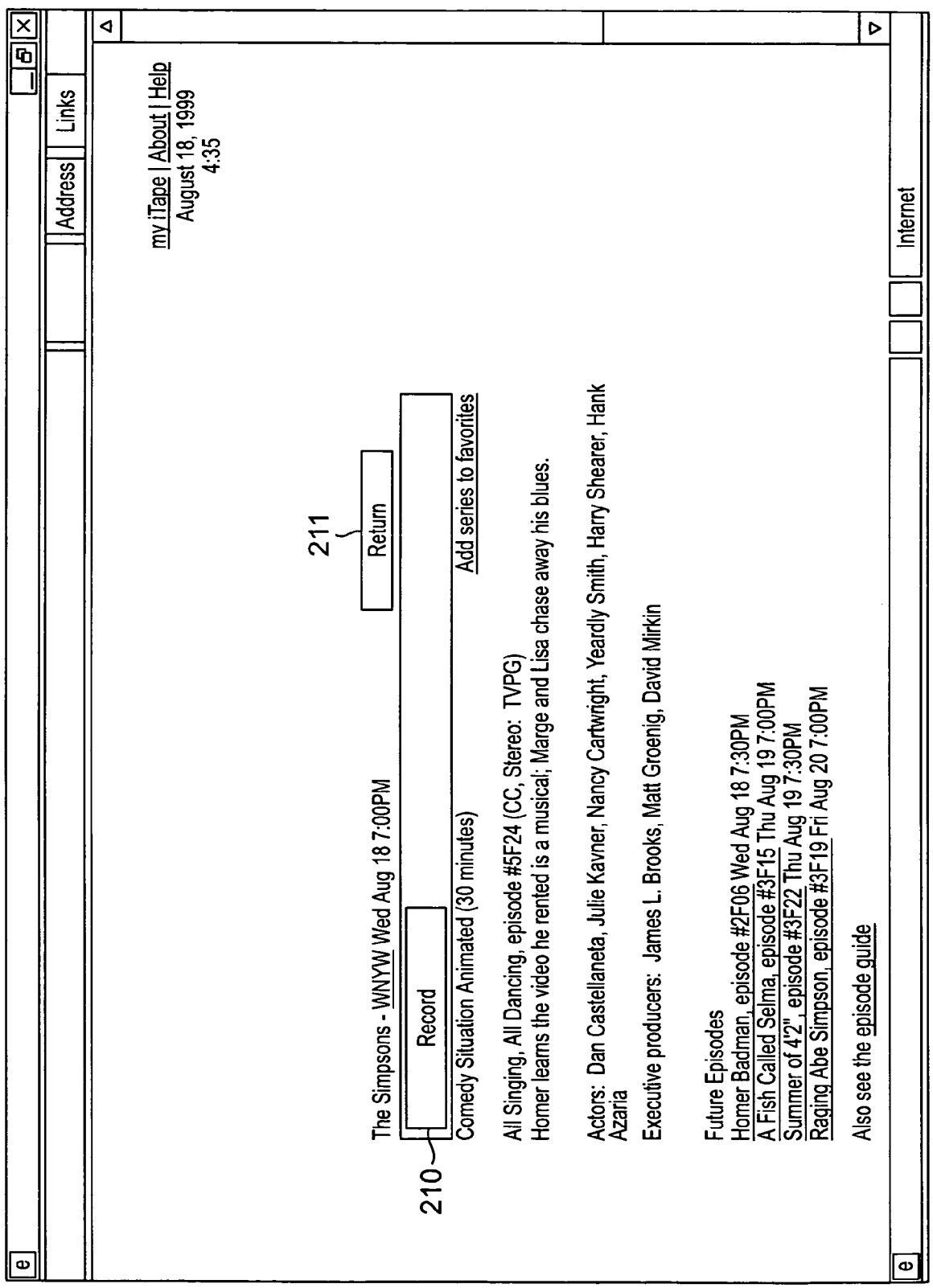
FIG. 5 represents a video screen presented to a client during program selection.

After the desired listing is presented at location 201 the client can click an entry of interest and press the full listing button 209. The client server 49 will respond by presenting a full listing of the selected program as shown in FIG. 5. The client can request storage of the selected program by pressing a record button 210 (FIG. 5) or can return to the listing of FIG. 4 by pressing a return button 211. The client may also select a program from the listing 201 and press the record button 217 (FIG. 4). The data representing the client's selection is then sent to the client server 49 which identifies an appropriate delivery system, e.g. 50a, and forwards a storage request to the scheduler 20 of the selected delivery system.

Should a client request storage of a media program the broadcast of which has already begun, the client server 49 will search listings for other locations to determine if the selected program has yet to be broadcast at another location. For example, if the client after 7:30 P.M. requests storage of the television program "Frasier" program will be available there at a later time. IF so, client server 49 will notify the delivery system 50 in the determined, e.g., Los Angeles, location to receive and store the requested program when broadcast.

A search tool 208 is also available to identify accessible media programs should the client not want to browse listings such as 201. With the search took, keywords are entered into a text portion and a search button is clicked to send the keywords to the client server for a search of all available location data bases. For example, a client may enter the text "hockey" into the search tool 208 and click the search button. The client server searches all of its available program listings for matches with the word hockey. The results (not shown) are then presented as a list, in the nature of a list created by a search engine, for review and selection by the client. The results of such a selection are sent to the client server 49 and used to implement program storage as discussed herein.

The selection screen of FIG. 4 also includes a genre drop-down menu 206 which permits a client to select a genre for which to receive a listing for program selections. The genre may include easy listening music, sports, movie comedy, movie action, or other categories. The contents of a genre is produced by the client server as a composite of all of the listings available to the recording system.

Upon receipt of a program storage request in step 509 (FIG. 5) the client server 49 forwards (step 511) to the scheduler 20 of the selected delivery system the identity of the program to be stored, the identity (e-mail address) of the requesting client, the data rate of the client and the type of streaming video delivery desired by the client. The scheduler 20 analyzes the information from the client server 49 in a step 513 and schedules the availability of a receiver/decoder, e.g. 53, and video digitizer, e.g. 23a, during the time that reception and storage is to take place. A storage routine is then scheduled in step 515 to execute on the scheduler 20 at a time just prior to the time at which storage is to begin, i.e. just prior to the scheduled start of the requested media program.

Figure 11:
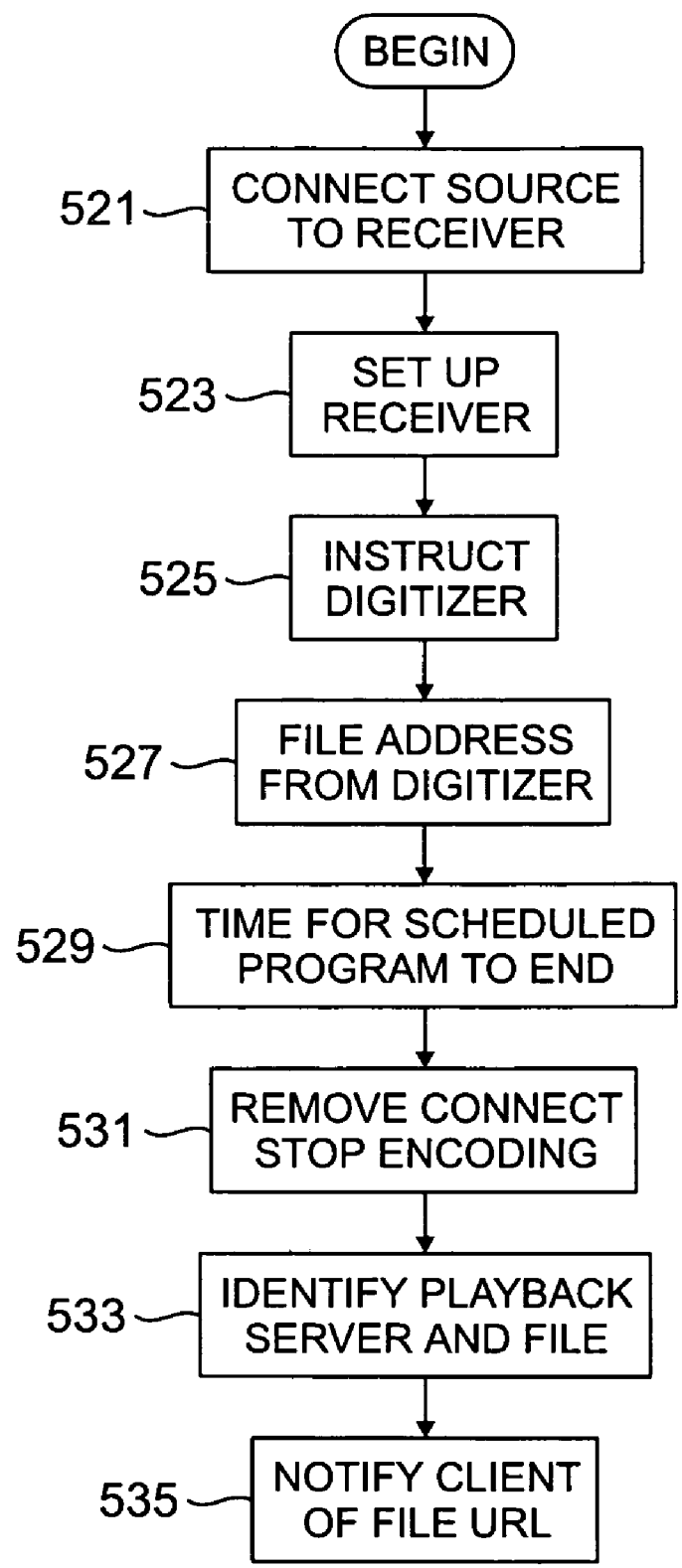
FIG. 11 is a flow diagram of a media delivery system during program storage.

Upon execution, the storage routine (FIG. 11) communicates with the devices scheduled to perform the requested program selection, encoding and storage. Initially, the scheduler 20 in step 521 transmits data to a multiswitch 80 a direction to connect the source, e.g. cable 33, to the decoder/receiver, e.g. 53, previously allocated to the scheduler. At about the same time, scheduler 20 transmits a command in step 523 to controller 91 specifying that it is to control receiver/decoder 53 to convert the channel carrying the selected program from cable 33 into baseband. The scheduler 20, as a part of the storage routine, also identifies the client's data rate and streaming media format to the digitizer 23a and directs in step 525 the encoding of base band signals from receiver/decoder 53 into uncompressed AVI and conversion of the result into Real Medial. The processor 95 of the digitizer 23a then stores the Real Media data stream as a file on store 97 and identifies the beginning file address to scheduler 20.

Figure 6:
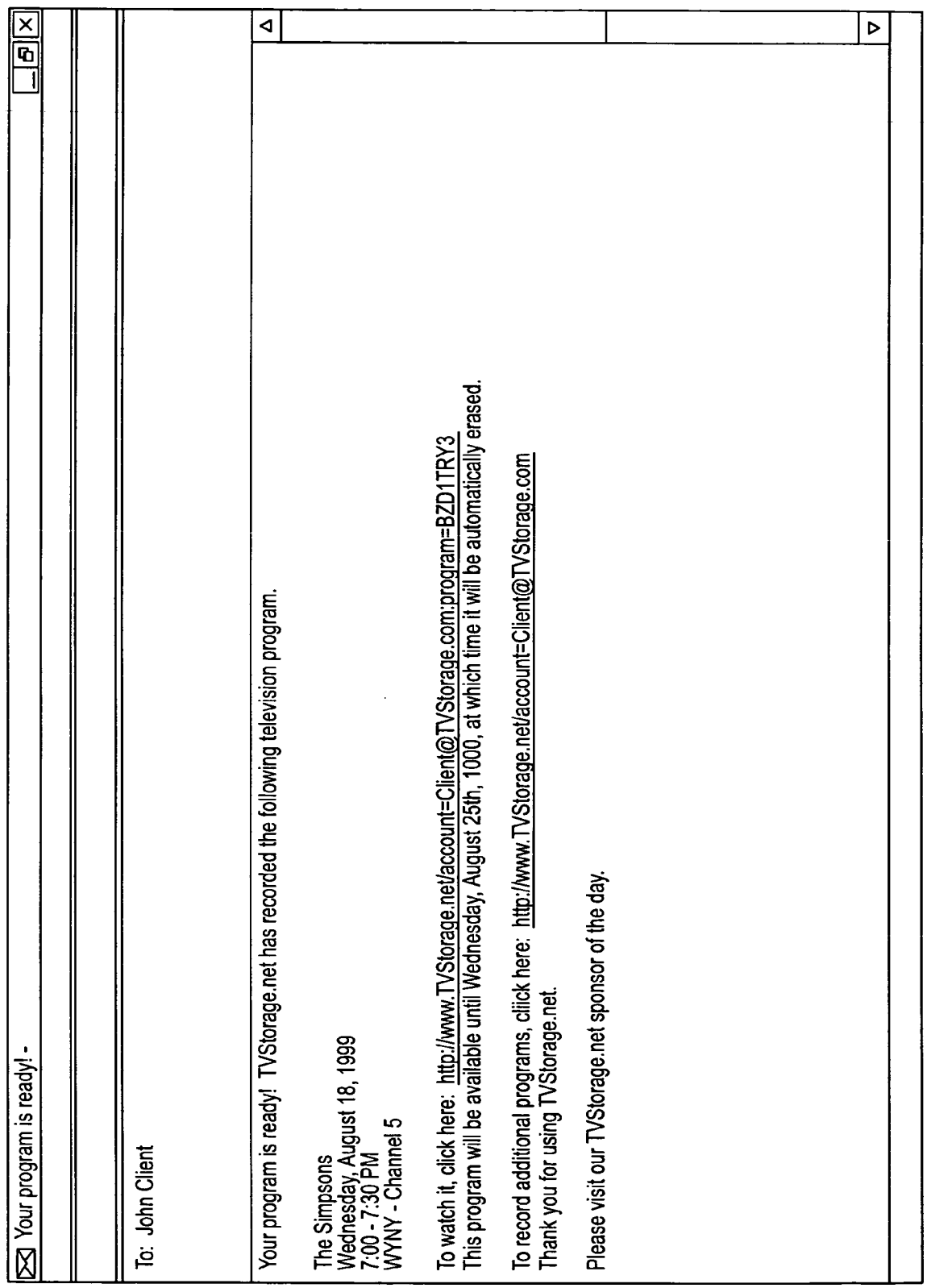
FIG. 6 represents a video screen presented to a client to announce storage of a requested program.

The scheduler then begins a timer in step 529 for the storage routine which times out at the scheduled end of the media program being stored. At time out the scheduler directs in step 531 the removal of connections established to receive the requested program and directs the digitizer 23a to stop the encoding and storage of the program. The storage routine then performs step 533 to identify a playback server, e.g. 105, to transmit the stored media program to the client upon the client's request. In the present example playback server 105 is identified because it provides streaming video in the Real Media format. Upon identifying the playback server 105, the scheduler 20 produces and sends (step 535) an e-mail message as shown in FIG. 6 back to client 15 which message identifies by URL the identified playback server 105 and the file to be accessed. As an example, the URL might be:

HTTP://www.TVstorage.net/
account=client@TVstorage.com:
program=BZD1TRY3 which identifies the playback server and the address of the media program file.

Figure 7:
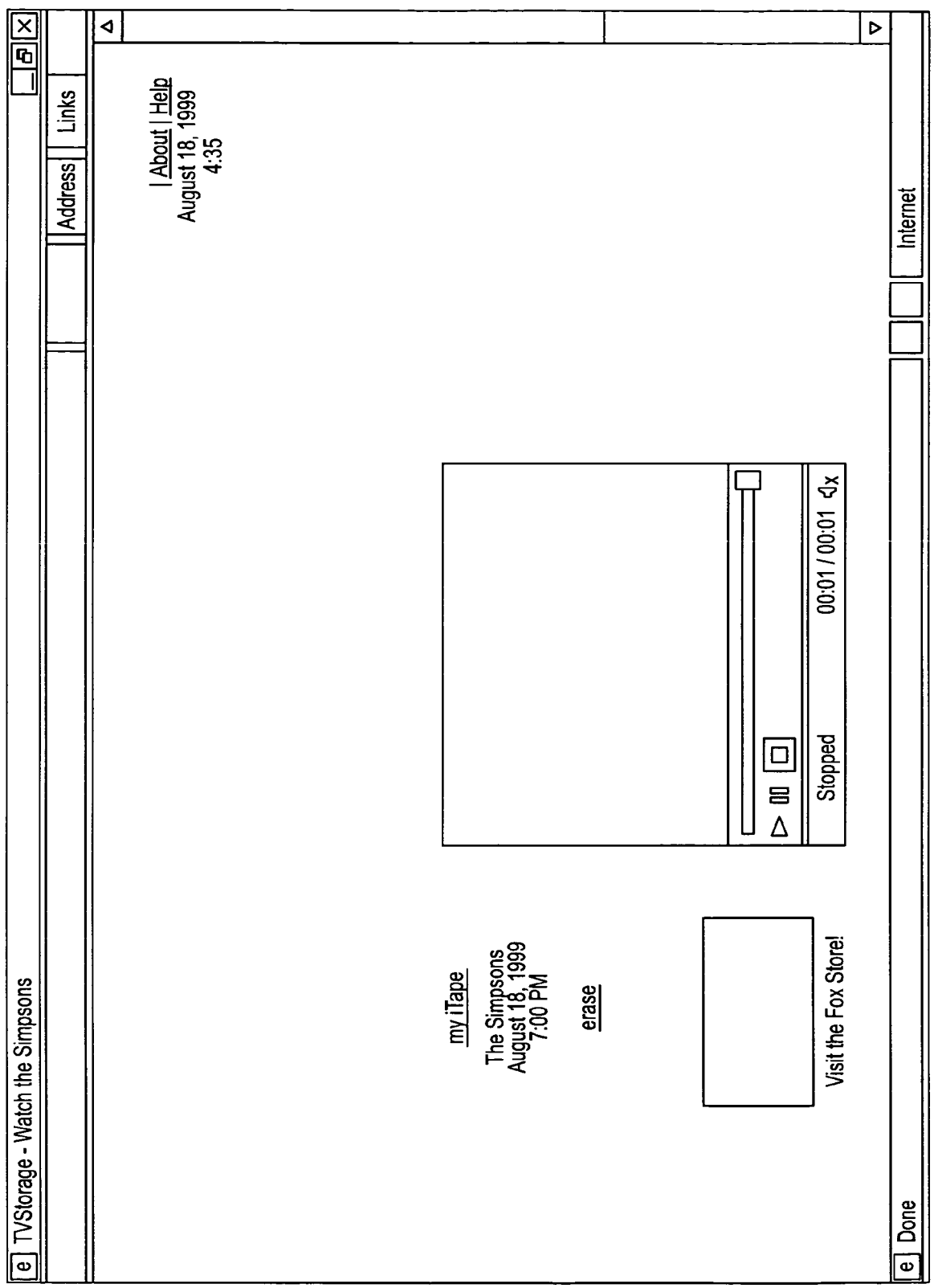
FIG. 7 represents a video screen of program presentation to a client.

The client 15 receives the e-mail from the scheduler and may access the file at a time selected by the client, by entering the URL from the e-mail. The playback server 105 responds to the URL by accessing the Real Media File stored for client 15 in memory 97 and forwarding that file to client 15 via the Internet. FIG. 7 represents a screen on which the stored media program is delivered to the client.

When a client signs up as a member, he or she specifies the grade of service wanted and an initial amount of storage to be allocated to the client. In the examples which follow it is assumed that the client has requested two hours of medium grade service. When a client requests storage of a program, the client server 49 accesses the client's parameter file and identifies the amount of storage available. Should the amount of storage available be less than that needed to store the requested program, the client server 49 does not set up storage via a delivery system, e.g. 50d, but instead returns a message to the client such as that shown in FIG. 12. Should the client click the "buy more" line, a new screen will be presented offering additional amounts of storage for displayed prices. When the client clicks an amount to buy more storage a billing event occurs and a billing parameter of the client is increased by the displayed price. Further, the amount of memory allocated to the client is increased by the amount purchased. Should the client not choose to purchase more storage a message is returned to the client indicating that the previously requested storage will not take place because of inadequate storage. When the client has or purchases enough storage to record a requested program the amount of storage required is subtracted from the client's allocated storage amount parameter before a delivery system, e.g. 50d, is instructed to store a requested program.

Each program stored by a delivery system, e.g. 50d, is automatically erased when viewed and also after the passage of a predetermined period of time after storage occurs. For example, if the client has not viewed a stored program within approximately one week after the program was stored, the program will "expire" and be erased. To avoid client mistakes, the client server reviews each client's account periodically and notifies a client if a stored program is to be erased within one day. FIG. 8 shows a screen which may be delivered to the client when a program is about to be erased. The warning screen of FIG. 8 gives the option of watching the program by clicking a link at 611 and also gives the client the option 613 of extending the storage period of the subject program for a fee. Should the client choose to extend the storage period, his or her account will be debited by the extension fee cost and the expiration period in the client parameters will be extended by the appropriate amount of time. On the screen shown in FIG. 8, clicking the link shown at 613 will add $1.95 to the client's account and extend the storage period for the identified "Simpsons" program for one week.

Figure 9:
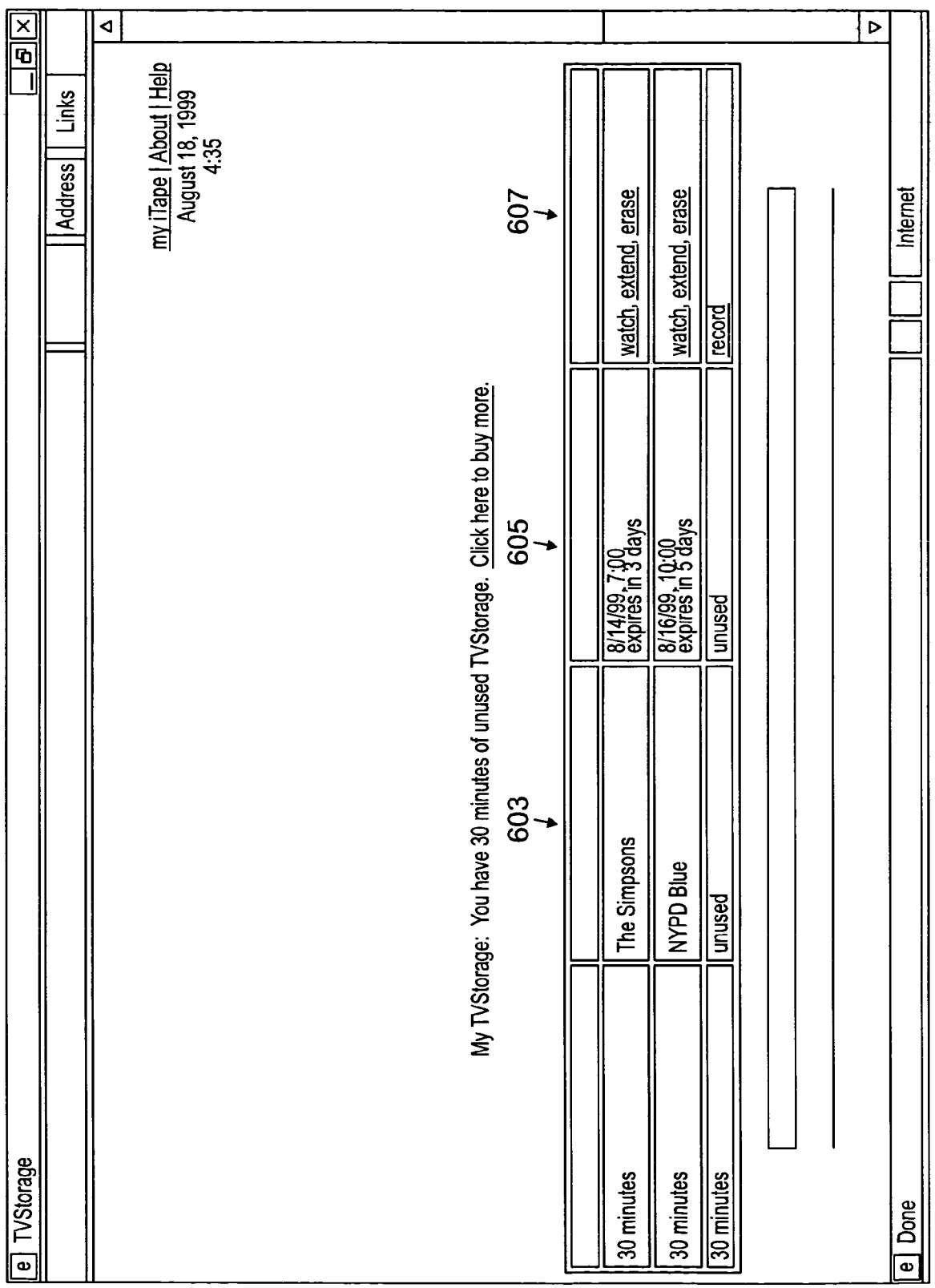
FIG. 9 represents a video screen notifying a client of the status of available storage.

From time to time the client server 49 reviews the status of memory usage for each member client. When a client having available storage time is identified, the client may be sent a message as shown n FIG. 9 to remind the client of the programs already in storage and the amount of unused storage time available. The screen of FIG. 9 identifies the programs in storage in a col. 603, the expiration dates of the stored programs in a col. 605 and provides hyperlinks to actions such as watch, extend and erase (col. 607) for each program. The client can ignore the message of FIG. 9 or follow one of the possible hyperlinks to other actions.

Figure 13:
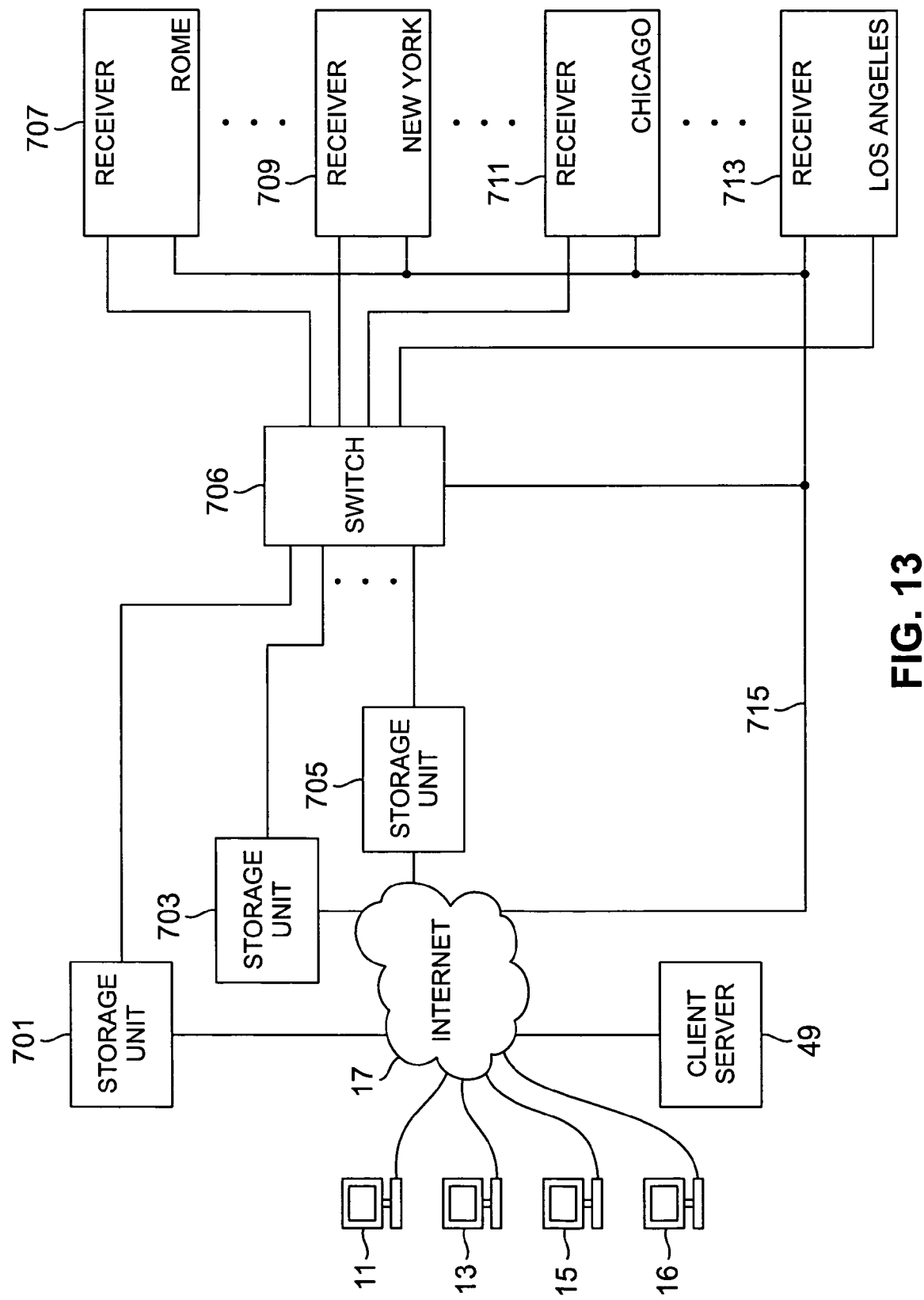
FIG. 13 is a block diagram of a system for median program reception and storage.

The preceding embodiments show media program signal reception and the coding and storage of media programs being performed by distributed delivery systems, each of which perform all functions. In an additional embodiment as shown in FIG. 13, the signal reception is shown to be distributed to receive signals in different geographical locations and the coding and storage functions also being distributed but remote from the signal reception. In FIG. 13 a plurality of clients 11 through 16 are connectable via the Internet 17 to a client server 49. Also connected to the Internet 17 are a plurality of storage units 701, 703 and 705. Each of the storage units is connected to a media program switch 706 as well as to other sources of media signals (not shown). The storage units 701, 703 and 705 receive media program signals from switch 706 and, under the control of client server 49, encode and store media programs requested by the clients 11–16. Switch 706 operates in response to commands from client server 49 via the Internet 17 and a connection 715 to connect selected media program signals from one or more of receivers 707, 709, 711 and 713 to the storage units 701, 703 and 705. The receivers 707, 709, 711 and 713 are geographically distributed in Rome, New York, Chicago and Los Angeles in the present example. Client server 49 is aware of the media program signals available at each of the receivers and can present listings representing the media programs at each receiver to the client 11–16 in the manner previously described. When client server 49 receives a media program request from a client, it identifies one of the receivers 707, 709, 711 and 713 which receives the requested program and controls switch 706 to connect the media program signal to a selected storage unit, e.g. 701. The selected storage unit, e.g. 701, is also directed to detect, encode, and store the requested media program signal and deliver it to the client on request. In the embodiment of FIG. 13, it is not required that the storage units be in any particular geographic location and may even be in a single storage center. Additionally, the media program signal switching functions of switch 706 may be distributed to a plurality of switches or other types of signal directing units.

It is understood that the above described embodiments are merely descriptive of the principles of the invention and that many variations may be devised by those skilled in the art without departing form the scope of the invention. It is intended that such variations be included within the scope of the claims.

What is claimed is:

1. A media program delivery method comprising:
   receiving a request for media program services, from a client amount a plurality of clients, for recording a delivery of media programs from a media program provider having access to sources of media and a plurality of media delivery systems having a scheduler for recording and playback control of media programs;
   determining a client storage capacity in storage remote to the client based on a grade of service selected by the client, wherein the grad of service comprises a duration of total media program time and a media program delivery data rate;
   storing the determined client storage capacity as a storage capacity parameter in a client file; and
   assigning a cost of the media program services by the media program provider to the client base on the client's selected grad of service.

2. The media program delivery method of claim 1 further comprising:
   receiving a request to record an identified media program from the client;
   determining whether the storage capacity required by the identified media program exceeds the client storage capacity;
   selecting the identified media program from a media source selected by the client or from a best available media source;
   recording the identified media program in a media format selected by the client in a media storage facility shared for media program services if the identified media program does not exceed the client storage capacity; and
   notifying the client of the amount of remaining client available storage time if the identified media program exceeds the client storage capacity and this remaining client available storage time is insufficient to record the identified media program.

3. The media program delivery method of claim 2 further comprising offering additional storage time to the client if the identified media program exceeds the client storage capacity.

4. The media program delivery method of claim 1 comprising:
   receiving a request for purchase of additional storage time from the client and in response thereto, increasing the storage capacity parameter in the client file to reflect the purchase of additional storage time.

5. The media program delivery method of claim 2 further comprising:
   delivering the identified media program to the client in the client selected media format upon the client requesting delivery of the identified media program.

6. The media program delivery method of claim 2 further comprising:
   determining the amount of storage time needed to store the identified media program and denying storage when the needed amount of storage time exceeds the amount of client storage capacity.

7. The media program delivery method of claim 6 further comprising:
   offering additional storage time to the client.

8. The media program delivery method of claim 2 wherein the identified media program is stored in a plurality of media program storage locations and the media program delivery method comprises notifying an allocator function of the total amount of storage capacity in use to store media programs request by the client.

9. A storage allocation method comprising:
   receiving a request from a client for media program services from a media program provider;
   determining a client storage capacity allocation based on a client's selected grade of service, wherein the grade of service comprises a duration of total media program time and a media program delivery data rate;
   allocating in a selected media storage facility shared for media program serviced the client's storage capacity allocation to use for media program storage;
   receiving a request for recording of an identified media program from the client;
   determining whether the storage capacity required by the identified media program exceeds the client storage capacity allocation;
   storing the identified media program for a predetermined time period if the identified media program does not exceed the client storage capacity allocation; and
   automatically reclaiming the amount of storage capacity used to store the identified media program at the end of the predetermined time period, wherein the reclaimed storage capacity may be reused by the client.

10. The storage allocation method of claim 9 further comprising:
notifying the client of an expiration date before the end of the predetermined time period.

11. The storage allocation method of claim 10 further comprising:
offering the client an additional time period of storage for the identified media program.

12. A media program storage system comprising:
a plurality of storage units for receiving and storing a predetermined plurality of requested media programs and for supporting a plurality of grads or service, said storage units being located in different geographic locations and each grade of service of the plurality of grades of service comprising a duration of total media program time and a media program delivery data rate;
a network accessible server for receiving requests for storage of the requested media programs from network connected clients and in response to a request from a client for a media program operates to notify one of the plurality of storage units to receive and store the requested media program in a client selected format wherein the network accessible server stores a value identifying an amount of storage available to the client and
the network accessible server operates to notify the requesting client of a network address at which to retrieve the stored media program.

13. The media program storage system of claim 12 further comprising:
apparatus responsive to a delivery request from the client via the network for delivering the stored media program in the client selected format to the client via the network.

14. The media program storage systems of claim 12 wherein the network accessible server stores a preferred listing of media program s for access by the client.

15. The media program storage system of claim 14 wherein the network accessible server stores listings of media programs in addition to the preferred listing.

* * * * *

UNITED STATES PATENT AND TRADEMARK OFFICE
CERTIFICATE OF CORRECTION

PATENT NO. : 7,143,430 B1
APPLICATION NO. : 09/440434
DATED : November 28, 2006
INVENTOR(S) : Fingerman et al.

Page 1 of 1

It is certified that error appears in the above-identified patent and that said Letters Patent is hereby corrected as shown below:

Column 11, line 46 "amount" should read --among--;
Column 11, line 46 "recording a" should read --recording and--;
Column 11, line 53 "grad" should read --grade--;
Column 11, line 59 "base" should read --based--;
Column 11, line 60 "grad" should read --grade--;

Column 12, line 44 "request" should read --requested--;
Column 12, line 54 "serviced" should read --services--;

Column 13, line 11 "program" should read --programs--;
Column 13, line 12 "or" should read --of--;
Column 13, line 12 "sand" should read --and--;
Column 13, line 12 "grads" should read --grades--;

Column 14, line 14 "systems" should read --system--;
Column 14, line 16 "program s" should read --programs--.

Signed and Sealed this

Thirty-first Day of August, 2010

David J. Kappos
*Director of the United States Patent and Trademark Office*